United States Patent
Damale et al.

(10) Patent No.: US 9,413,869 B2
(45) Date of Patent: Aug. 9, 2016

(54) MOBILE DEVICE HAVING PLURALITY OF INPUT MODES

(75) Inventors: Shridhar Y. Damale, Fremont, CA (US); Niraj Bali, Fremont, CA (US)

(73) Assignee: Qualcomm Incorporated, San Diego, CA (US)

( * ) Notice: Subject to any disclaimer, the term of this patent is extended or adjusted under 35 U.S.C. 154(b) by 952 days.

(21) Appl. No.: 12/703,592

(22) Filed: Feb. 10, 2010

(65) Prior Publication Data

US 2011/0195758 A1   Aug. 11, 2011

(51) Int. Cl.
*H04W 4/08*   (2009.01)
*H04M 1/725*   (2006.01)
*H04M 1/60*   (2006.01)

(52) U.S. Cl.
CPC ........ *H04M 1/72522* (2013.01); *H04M 1/6075* (2013.01); *H04M 1/72566* (2013.01); *H04M 1/72572* (2013.01); *H04M 1/72552* (2013.01); *H04M 1/72558* (2013.01); *H04M 1/72561* (2013.01); *H04M 1/72594* (2013.01); *H04M 2250/12* (2013.01); *H04M 2250/22* (2013.01); *H04M 2250/74* (2013.01)

(58) Field of Classification Search
USPC ............. 455/563, 556.1, 556.2, 569.1, 569.2, 455/414.1–414.4, 460
See application file for complete search history.

(56) References Cited

U.S. PATENT DOCUMENTS

| 6,212,408 | B1* | 4/2001 | Son et al. | 455/563 |
|---|---|---|---|---|
| 7,072,686 | B1* | 7/2006 | Schrager | 455/556.1 |
| 7,120,234 | B1* | 10/2006 | Quinn et al. | 455/563 |
| 7,792,253 | B2* | 9/2010 | Agapi et al. | 379/88.14 |
| 2004/0176139 | A1* | 9/2004 | Wang | 455/563 |
| 2004/0186728 | A1* | 9/2004 | Kuboyama et al. | 704/276 |
| 2006/0173801 | A1* | 8/2006 | Music | 706/45 |
| 2007/0129098 | A1* | 6/2007 | Cheng et al. | 455/563 |
| 2009/0253454 | A1 | 10/2009 | Sampson | |
| 2009/0253463 | A1 | 10/2009 | Shin et al. | |
| 2010/0223055 | A1* | 9/2010 | McLean | 704/235 |

(Continued)

FOREIGN PATENT DOCUMENTS

| CN | 101557432 A | 10/2009 |
|---|---|---|
| EP | 1523161 A1 | 4/2005 |

(Continued)

OTHER PUBLICATIONS

International Search Report and Written Opinion, International Application No. PCT/US2011/023353 filed Feb. 1, 2011, Date of Mailing: Sep. 30, 2011, pp. 1-10.
Supplementary European Search Report—EP11742628, Search Authority—The Hague, Jan. 2, 2014.

*Primary Examiner* — Wen Huang
(74) *Attorney, Agent, or Firm* — Kilpatrick Townsend & Stockton LLP

(57) ABSTRACT

A mobile device or system comprises a housing, a voice sensor that is configured to detect sound, a speaker, and a processing circuit configured to operate in both a first mode and a second mode. The processing circuit receives instructions from a user by detecting the user touching the device or an accessory of the device when in the first mode and receives instructions from the voice of the user through the voice sensor when in the second mode. When a predetermined requirement is met, the processing circuit is configured to switch from a first mode to a second mode without receiving specific instructions from the user to switch the mode at the time of switching.

4 Claims, 8 Drawing Sheets

(56) References Cited

U.S. PATENT DOCUMENTS

2010/0298010 A1* 11/2010 Roth et al. .................. 455/563
2010/0328223 A1* 12/2010 Mockarram-Dorri
 et al. ............................. 345/173

FOREIGN PATENT DOCUMENTS

| KR | 10-2007-0034257 A | 3/2007 |
| KR | 10-0691972 B1 | 3/2007 |
| WO | 0067497 A1 | 11/2000 |

* cited by examiner

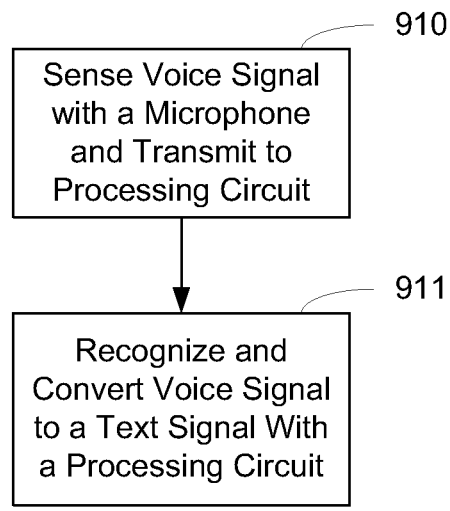
FIG. 9.1
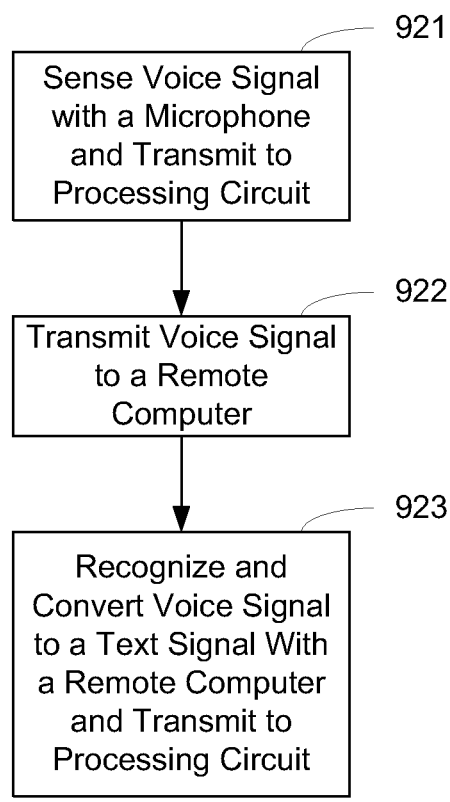
FIG. 9.2

MOBILE DEVICE HAVING PLURALITY OF INPUT MODES

BACKGROUND

A user of a mobile phone sometimes uses the phone while not holding it. For example, the user may want to use a phone while driving a car. At this time, it is difficult for the user to interact with the phone because traditionally the user must touch the input device of the phone to provide instructions.

In addition, sometimes a user may want to use many applications of a handheld computer but it is inconvenient or impossible for the user to watch the display of the handheld computer. For example, the user may be blind. The user may want to listen to music, check for weather, receive and reply to emails and get the latest stock quotes, all without having to watch the handheld computer.

SUMMARY

One exemplary embodiment relates to a mobile device. The mobile device includes a housing, a voice sensor that is configured to detect sound, and a speaker. The mobile device also includes a processing circuit that is configured to operate in both a first mode and a second mode. When in the first mode, the processing circuit is configured to receive instructions from a user by detecting the user touching the device or an accessory of the device. When in the second mode, the processing circuit is configured to receive instructions from the voice of the user through the voice sensor. When a predetermined requirement is met, the processing circuit is configured to switch from a first mode to a second mode without receiving specific instructions from the user to switch the mode at the time of switching.

Another exemplary embodiment relates to a method of switching the device from a first mode to a second mode. The method includes switching the device, based on circumstance and/or state of the device, from the first mode to the second mode when a predetermined requirement is met. In the first mode, one or more processing circuits are configured to receive instructions from a user by detecting the user touching the device or an accessory of the device. In the second mode, the one or more processing circuits are configured to receive instructions from voice of the user.

Yet another exemplary embodiment relates to a mobile computing device including a housing configured to be held in a hand during use, a user input device configured to detect a user touching the mobile device or an accessory of the device and to covert the touches into first digital instructions, a voice sensor configured to detect sound, a speech conversion module configured to convert the sound into second digital instructions, and a processing module. The processing module is configured in a first mode to provide the first digital instructions to any of a plurality of different programs or applications and, in a second mode, to provide the second digital instructions to any of the plurality of different programs or applications.

BRIEF DESCRIPTION OF THE DRAWINGS

FIG. 9.1 is a flowchart of a process in the mobile device of an instruction from a voice reaching an application or a program according to an exemplary embodiment.

FIG. 9.2 is a flowchart of a process in the mobile device of an instruction from a voice reaching an application or a program according to another exemplary embodiment.

DETAILED DESCRIPTION OF EXEMPLARY EMBODIMENTS

Figure 1:
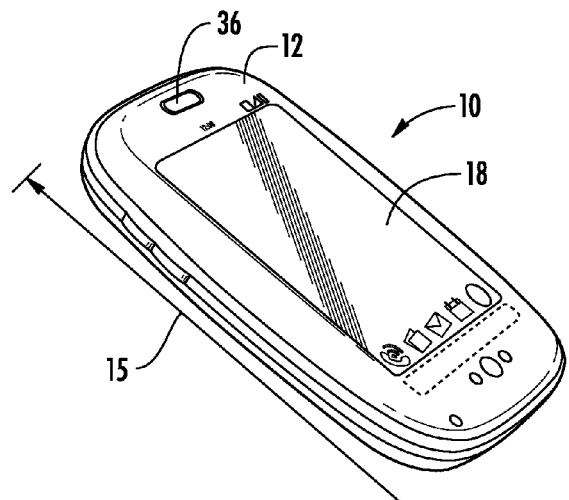
FIG. 1 is a perspective view of a mobile device according to an exemplary embodiment.

Some embodiments described herein may enable a mobile device to switch from one operating mode/profile to another operating mode/profile automatically. Some embodiments described herein may enable a mobile device to have a voice user interface. Some embodiments described herein may provide a mobile device an voice mode/profile that is transparent to any of a plurality of programs/applications. Some embodiments may allow a user to interact with the phone or handheld computer both by touching and watching and by speaking and listening. Some embodiments may allow a user to switch between the two ways of interaction in different circumstances and situation (e.g. the context of the user and/or phone) to indicate that the user may want to interact with the phone in voice mode.

Some embodiments described herein may provide a mobile device or a method that enables a user to use all or most applications of a phone by voice instruction. Some embodiments may provide a handheld computer or a system that has a voice mode, in which all instructions to the handheld computer and all feedback and information from the handheld computer are delivered by voice.

Some embodiments described herein may provide a mobile device or a system that has two modes, one traditional mode and one voice mode. When in the voice mode, the phone can receive instructions from a user's voice.

Some embodiments described herein may provide a phone or a method that provides automatic switching between the two modes, without a user's instruction when switching. Switching of modes may occur automatically based on a device's internal state, outside circumstances and/or other contexts.

Referring to FIGS. 1-4, a mobile device 10 is shown. The teachings herein can be applied to device 10 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 10 may be a smartphone, which is a combination mobile telephone and handheld computer having PDA functionality. PDA functionality can comprise of one or more of personal information management (e.g., including personal data applications such as email, calendar, contacts, etc.), database functions, word processing, spreadsheets, voice memo recording, Global Positioning System (GPS) functionality, etc. Device 10 may be configured to synchronize personal information from these applications with a computer (e.g., a desktop, laptop, server, etc.). Device 10 may be further configured to receive and operate additional applications provided to device 10 after manufacture, e.g., via wired or wireless download, SecureDigital card, etc.

As shown in FIGS. 1-4, device 10 includes a housing 12 and a front 14 and a back 16. Device 10 further comprises a display 18 and a user input device 20 (e.g., a QWERTY or alphanumeric keyboard, buttons, touch screen, speech recognition engine, etc.). Display 18 may comprise a touch screen display in order to provide user input to a processor 102 (see FIG. 4) to control functions, such as to select options displayed on display 18, enter text input to device 10, or enter other types of input. Display 18 also provides images (see, e.g., FIG. 5) that are displayed and may be viewed by users of device 10. User input device 20 can provide similar inputs as those of touch screen display 18. An input button 40 may be provided on front 14 and may be configured to perform pre-programmed functions. Device 10 can further comprise a speaker 26, a stylus (not shown) to assist the user in making selections on display 18, a camera 28, a camera flash 32, a microphone 34, a light sensor and an earpiece 36. Display 18 may comprise a capacitive touch screen, a mutual capacitance touch screen, a self capacitance touch screen, a resistive touch screen, a touch screen using cameras and light such as a surface multi-touch screen, proximity sensors, or other touch screen technologies, and so on. Display 18 may be configured to receive inputs from finger touches at a plurality of locations on display 18 at the same time. Display 18 may be configured to receive a finger swipe or other directional input, which may be interpreted by a processing circuit to control certain functions distinct from a single touch input. Further, a gesture area 30 may be provided adjacent (e.g., below, above, to a side, etc.) or be incorporated into display 18 to receive various gestures as inputs, including taps, swipes, drags, flips, pinches, and so on. One or more indicator areas 38 (e.g., lights, etc.) may be provided to indicate that a gesture has been received from a user.

According to an exemplary embodiment, housing 12 is configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment.

Figure 2:
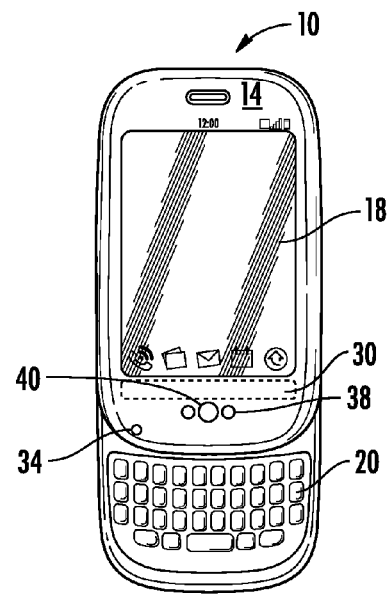
FIG. 2 is a front view of the mobile device of FIG. 1 in an extended configuration according to an exemplary embodiment.
Figure 3:
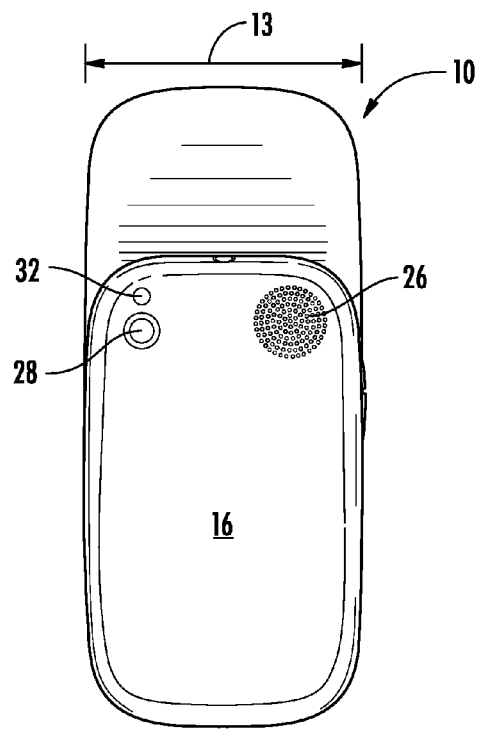
FIG. 3 is a back view of the mobile device of FIG. 1 in an extended configuration according to an exemplary embodiment.
Figure 4:
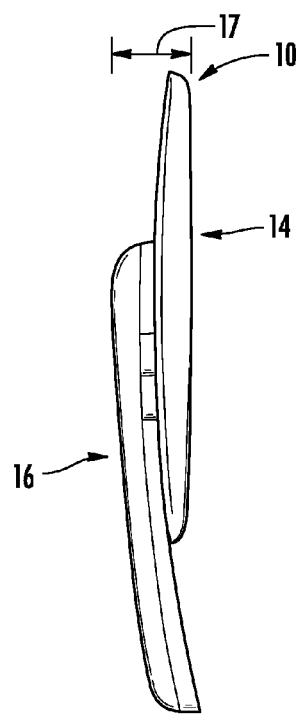
FIG. 4 is a side view of the mobile device of FIG. 1 in an extended configuration according to an exemplary embodiment

Device 10 may be a handheld computer, which is a computer small enough to be carried in a hand of a user, comprising such devices as typical mobile telephones and personal digital assistants, but excluding typical laptop computers and tablet PCs. The various input devices and other components of device 10 as described below may be positioned anywhere on device 10 (e.g., the front surface shown in FIG. 2, the rear surface shown in FIG. 3, the side surfaces as shown in FIG. 4, etc.). Furthermore, various components such as a keyboard etc. may be retractable to slide in and out from a portion of device 10 to be revealed along any of the sides of device 10, etc. For example, as shown in FIGS. 2-4, front 14 may be slidably adjustable relative to back 16 to reveal input device 20, such that in a retracted configuration (see FIG. 1) input device 20 is not visible, and in an extended configuration (see FIGS. 2-4) input device 20 is visible.

According to various exemplary embodiments, housing 12 may be any size or shape, and have a variety of length, width, thickness, and volume dimensions. For example, width 13 may be no more than about 200 millimeters (mm), 100 mm, 85 mm, or 65 mm, or alternatively, at least about 30 mm, 50 mm, or 55 mm. Length 15 may be no more than about 200 mm, 150 mm, 135 mm, or 125 mm, or alternatively, at least about 70 mm or 100 mm. Thickness 17 may be no more than about 150 mm, 50 mm, 25 mm, or 15 mm, or alternatively, at least about 10 mm, 15 mm, or 50 mm. The volume of housing 12 may be no more than about 2500 cubic centimeters (cc) or 1500 cc, or alternatively, at least about 1000 cc or 600 cc.

Device 10 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 10 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Long Term Evolution (LTE) systems, etc.

Device 10 may be configured to provide voice and/or data communications functionality in accordance with different types of wireless network systems. Examples of wireless network systems may further include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 10 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth.

Figure 5:
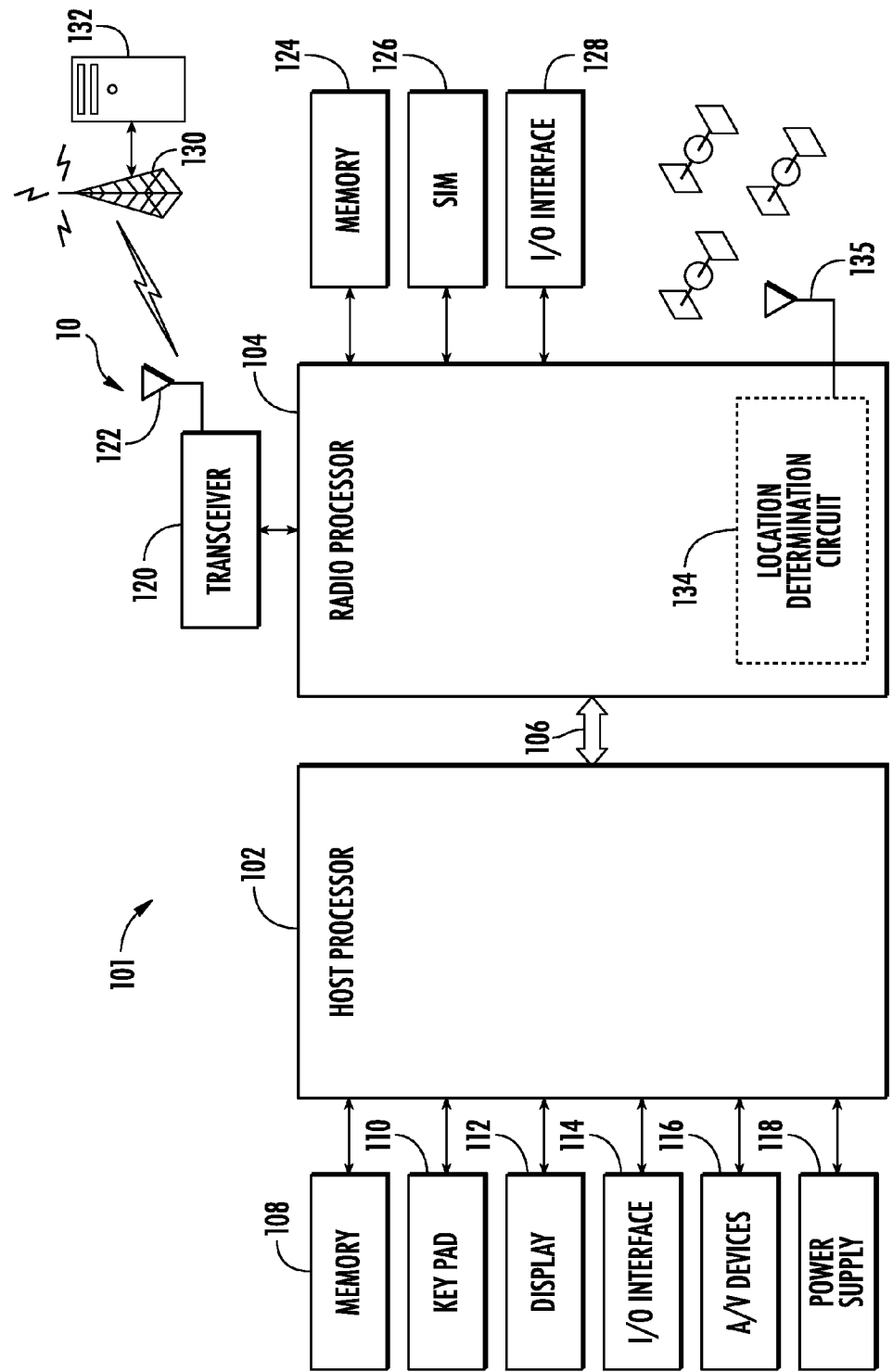
FIG. 5 is a block diagram of the mobile device of FIG. 1 according to an exemplary embodiment.

As shown in the embodiment of FIG. 5, device 10 may comprise a dual processor architecture including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 10. The radio processor 104 may be responsible for performing various voice and data communications operations for device 10 such as transmitting and receiving voice and data information over one or more wireless communications channels. Although embodiments of the dual processor architecture may be described as comprising the host processor 102 and the radio processor 104 for purposes of illustration, the dual processor architecture of device 10 may comprise additional processors, may be implemented as a dual- or multi-core chip with both host processor 102 and radio processor 104 on a single chip, etc.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In an exemplary embodiment, host processor 102 is an OMAP2, such as an OMAP2431 processor, manufactured by Texas Instruments, Inc.

The host processor 102 may be configured to provide processing or computing resources to device 10. For example, the host processor 102 may be responsible for executing various software programs such as application programs and system programs to provide computing and processing operations for device 10. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 10 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 10 may utilize any suitable OS in accordance with the described embodiments such as a Palm webOS, Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 10 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 108 may be shown as being separate from the host processor 102 for purposes of illustration, in various embodiments, some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 10 may comprise an expansion slot to support a multimedia and/or memory card, for example.

Device 10 may comprise a user input device 110 coupled to the host processor 102. The user input device 110 may comprise, for example, a QWERTY key layout and an integrated number dial pad. Device 10 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

The host processor 102 may be coupled to a display 112. The display 112 may comprise any suitable visual interface for displaying content to a user of device 10. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 10 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 10 may be configured to transfer and/or synchronize information with the local computer system.

The host processor 102 may be coupled to various audio/video (A/V) devices 116 that support the A/V capability of device 10. Examples of A/V devices 116 may include, for example, a microphone, a headset, a car speaker, one or more other speakers, an audio port to connect an audio headset, an audio coder/decoder (codec), an audio player, a digital camera, a video camera, a video codec, a video player and so forth.

The host processor 102 may be coupled to a power supply 118 configured to supply and manage power to the elements of device 10. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 10. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or base band processor. Although some embodiments may be described with the radio processor 104 implemented as a modem processor or base band processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

In various embodiments, the radio processor 104 may perform analog and/or digital base band operations for device 10. For example, the radio processor 104 may perform digital-to-analog conversion (DAC), analog-to-digital conversion (ADC), modulation, demodulation, encoding, decoding, encryption, decryption, and so forth.

Device 10 may comprise a transceiver module 120 coupled to the radio processor 104. The transceiver module 120 may comprise one or more transceivers configured to communicate using different types of protocols, communication ranges, operating power requirements, RF sub-bands, information types (e.g., voice or data), use scenarios, applications, and so forth. In various embodiments, the transceiver module 120 may comprise one or more transceivers configured to support voice communication for a cellular radiotelephone system such as a GSM, UMTS, CDMA, and/or LTE system. The transceiver module 120 also may comprise one or more transceivers configured to perform data communications in accordance with one or more wireless communications protocols such as WWAN protocols (e.g., GSM/GPRS protocols, CDMA/1×RTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, in various embodiments some portion or the entire transceiver module 120 may be included on the same integrated circuit as the radio processor 104.

Device 10 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

Device 10 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104.

Device 10 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 10 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 10 and one or more external computer systems.

In various embodiments, device 10 may comprise location or position determination capabilities. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFLT) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 10 may be configured to operate in one or more location determination modes including, for example, a standalone mode, a mobile station (MS) assisted mode, and/or a MS-based mode. In a standalone mode, such as a standalone GPS mode, device 10 may be configured to determine its position without receiving wireless navigation data from the network, though it may receive certain types of position assist data, such as almanac, ephemeris, and coarse data. In one embodiment, device 10 may comprise a local location determination circuit 134 (e.g., a GPS receiver) which may be integrated within housing 12 (FIG. 1) configured to receive satellite data via an antenna 135 and to calculate a position fix. Local location determination circuit may alternatively comprise a GPS receiver in a second housing separate from housing 12 but in the vicinity of device 10 and configured to communicate with device 10 wirelessly (e.g., via a PAN, such as Bluetooth). When operating in an MS-assisted mode or an MS-based mode, however, device 10 may be configured to communicate over a radio access network 130 (e.g., UMTS radio access network) with a remote computer 132 (e.g., a location determination entity (PDE), a location proxy server (LPS) and/or a mobile positioning center (MPC), etc.).

In an MS-assisted mode, such as an MS-assisted AGPS mode, the remote computer 132 may be configured to determine the position of the mobile computing device and provide wireless data comprising a position fix. When assisting the mobile computing device 10, the remote computer 132 may handle various processing operations and also may provide information to aid location determination.

In various embodiments, device 10 may comprise dedicated hardware circuits or structures, or a combination of dedicated hardware and associated software, to support location determination. For example, the transceiver module 120 and the antenna system 122 may comprise GPS receiver or transceiver hardware and one or more associated antennas coupled to the radio processor 104 to support location determination.

Figure 6:
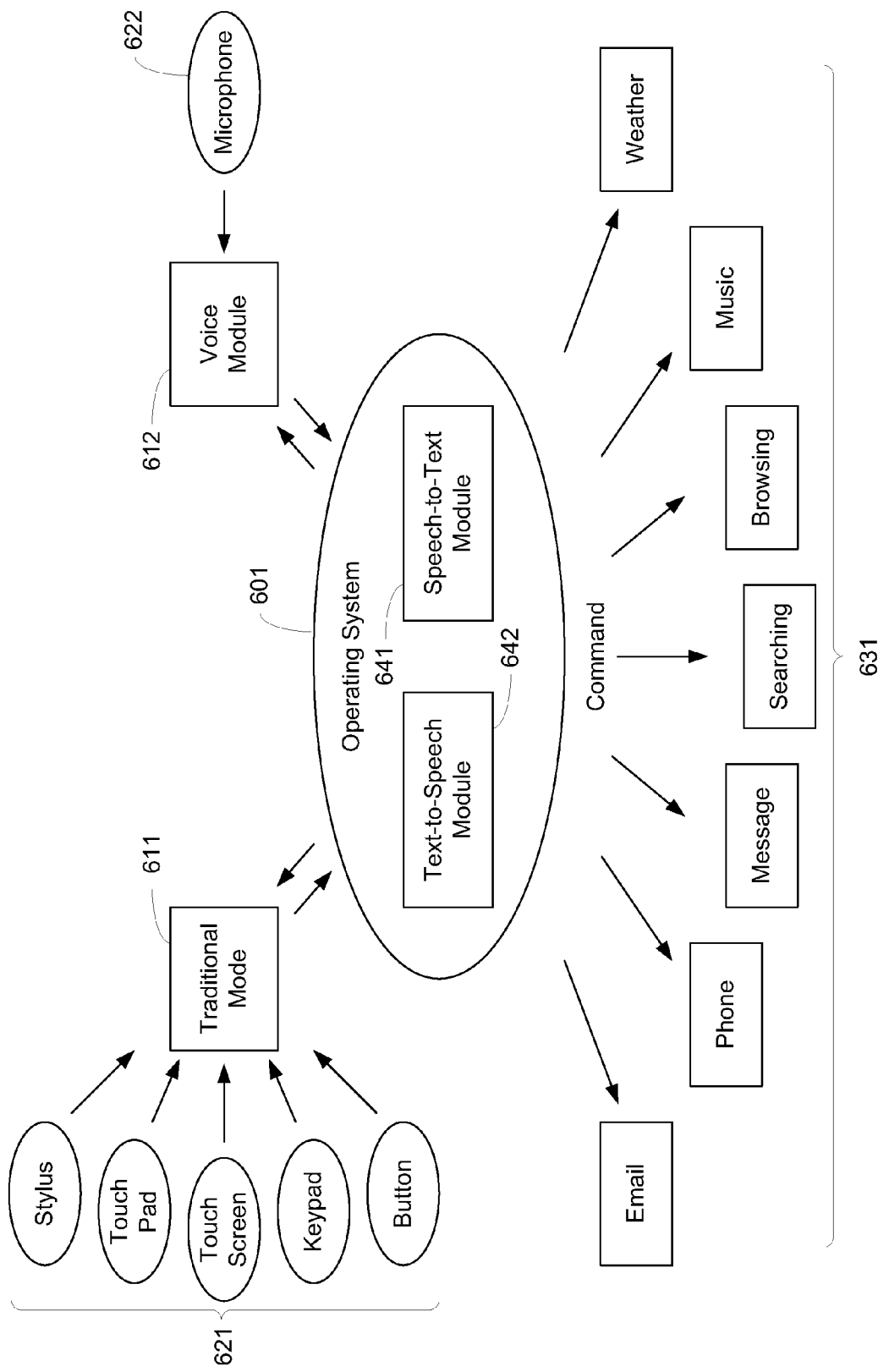
FIG. 6 is a block diagram of the mobile device according to an exemplary embodiment.

Referring to FIG. 6, in one exemplary embodiment, device 10 includes an operating system, operating system 601, that is implemented on the processors. Operating system 601 is configured to receives signals from user input devices 621 and microphone 622 and provide command signals or digital instructions to applications and programs 631. Operating system 601 is also configured to receive data and/or information signals from applications and programs 631 and provide signals to display 18 and speakers. Operating system 601 may work in two different operating modes, a traditional mode/profile 611 and a voice mode/profile 612. Operating system 601 may further include a speech-to-text module 641 and a text-to-speech module 642. The speech-to-text module 641 is a speech conversion module that is configured to convert audio signals into text, such as words, phonemes, ASCII characters, etc. . . . . The text-to-speech module 642 is a text conversion module that is configured to convert text into audio signals. In one exemplary embodiment, operating system 601 is an upgraded version of webOS by Palm, Inc., Sunnyvale, Calif., or webOS installed with voice mode software. webOS is a LINUX-based operating system which uses a system of "cards" used to manage multitasking. In another embodiment, operating system 601 is an application manager software that is specialized at managing applications on a cell phone or a handheld computer. In another exemplary embodiment, operating system 601 provided to the user with device 10 so that the user is provided with an end-to-end solution regarding voice mode/profile 612. Accordingly, the user does not need to seek software or hardware in addition to device 10 to implement functions described in various embodiments.

Under traditional mode 611, a user provides instructions through user input devices 621, which may include a key pad, a touch screen, a touch pad, a button, a mouse, a stylus, or any input devices that a user can touch to provide his intent or instruction. A user touching one of the user input devices 621 may involve more than one movement, such as pushing, pulling, stroking, clicking, grabbing, typing, or any movement that signals the user's intent by putting part of the user's body into contact with one of the user input devices 621. When operating system 601 receives the instructions, it sends corresponding commands or digital instructions to applications and programs 631 that the user wants to use or is using.

Under voice mode 612, a user provides instructions by voice through a voice sensor, e.g., microphone 622. Microphone 622 converts the voice into voice signals. The speech-to-text module 641 then converts the voice signal into text. Operating system 601 recognizes the text and converts the text into instructions. Alternatively, operating system 601 can also directly convert the voice signal into instructions. Operating system 601 then sends corresponding commands or digital instructions to applications and programs 631. The device may be configured to operate under additional modes, which may combine features from the traditional and voice mode or have other user input features.

When any of the applications and programs 631 have information or data for users, it may send text information to operating system 601. In traditional mode 611, operating system 601 may display the text on display 18. In voice mode 612, operating system 601 may convert the text into voice with text-to-speech module 642 and provide the voice to the user through a speaker. In one exemplary embodiment, the text-to-speech module 642 shares a processor with other applications. In another exemplary embodiment, there is a processor dedicated to converting text to speech.

Applications and programs 631 may include email, phone call, SMS, internet searching, web browser, text processing, music playing, weather, stock quotes, games, or any applications, programs, functions or services that a mobile device may provide.

According to one exemplary embodiment, operating modes of operating system 601 are transparent to applications and programs 631. In this exemplary embodiment, for the same instruction, the commands or digital instructions sent to applications and programs 631 are the same regardless of whether the corresponding instructions are received from user input devices 621 or microphone 622. In another embodiment, for the same instruction, a portion of the command or digital instruction sent to applications and programs 631 are the same. In one exemplary embodiment, applications and programs 631 receive commands or digital instructions in the same way (e.g., in a same data format and/or data content) regardless of whether the corresponding instructions are received from user input devices 621 or microphone 622. In another exemplary embodiment, applications and programs 631 receive and process the commands or digital instructions in very similar ways. This agnostic structure can reduce the need to modify or upgrade applications and programs 631 because applications and programs 631 that are compatible with traditional mode 611 will be compatible with voice mode 612.

Figure 7:
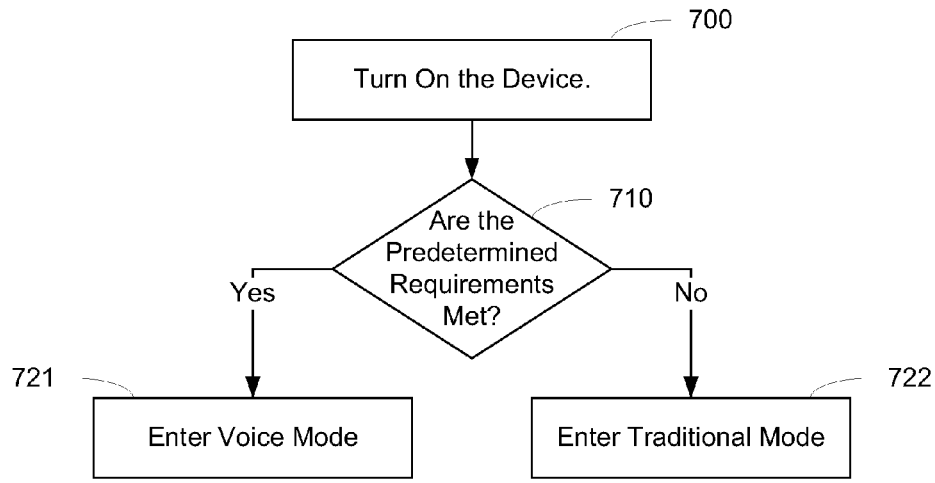
FIG. 7 is a flowchart of a process of determining the mode of the mobile device according to an exemplary embodiment.

Referring to FIG. 7, when device 10 is turned on (step 700), it checks whether predetermined requirements are met to decide which mode it should be operating in (step 710). If the predetermined requirements are met, device 10 will enter voice mode 612 (step 721). (Otherwise, device 10 will enter traditional mode 611 (step 722). The predetermined requirements (such as determining that device 10 is in communication with a hands-free car phone) can include any automatic requirement, which may include any requirement that does not require user input to determined the mode at the time of determining or switching mode.

Figure 8:
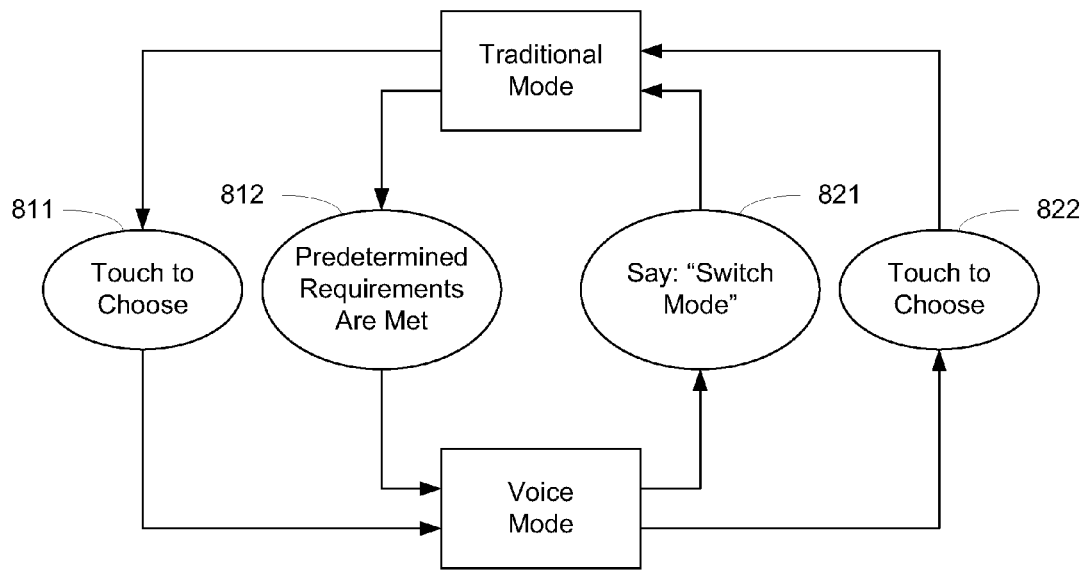
FIG. 8 is a flowchart of processes of the mobile device switching between modes according to an exemplary embodiment.

Referring to FIG. 8, device 10 may switch between two modes. In one exemplary mode, when device 10 is operating in traditional mode 611, a user may touch user input device 621 to change to voice mode 612. (Step 811.) Alternatively, when a predetermined requirement is met, device 10 will change to voice mode 612 automatically, without further instructions from the user. (Step 812.) When device 10 is in voice mode 612, a user can either say, e.g., "switch mode" (step 821) or touch a user input device 621 (step 822) to switch device 10 to traditional mode 611.

In various exemplary embodiments, the predetermined requirements include circumstance and/or state of the device. In one embodiment, device 10 may switch from the traditional mode 611 to voice mode 612 when device 10 detects the circumstance around it meets certain conditions. In another exemplary embodiment, device 10 may switch from the traditional mode 611 to voice mode 612 when its internal state changes in a certain way.

In one exemplary embodiment, the predetermined requirements include that device 10 is in communication with (e.g., connected in a wired or wireless manner) a car. For example, when device 10 is connected to a car-kit device, device 10 will automatically switch to voice mode 612. Therefore, when the user is driving and receives an email or other data to be presented to the user, the user does not need to manually switch device 10 to voice mode 612.

In another exemplary embodiment, device 10 has location determination circuit 134 and a user can set certain locations, e.g., a parking lot, home driveway, or on the way to work, as one of the predetermined requirements. When device 10 detects that it is located within a range of longitude and latitude of the predetermined location(s), device 10 will switch to voice mode 612.

In another exemplary embodiment, device 10 has location determination circuit 134 and the predetermined requirements include that device 10 is moving faster than a certain speed. For example, if device 10 detects that it is moving faster than 20 miles per hour, which indicates that the user is possibly driving, device 10 will switch to voice mode 612 without requiring user input.

In another exemplary embodiment, the predetermined requirements include that a certain time has arrived. For example, a user may set a calendar event and know that the user would not be able to hold the phone when the event happens. The user can set device 10 in such a way that when the calendar event is activated, device 10 switches to voice mode 612 without further instruction.

In another exemplary embodiment, device 10 is equipped with a light sensor that is configured to detect intensity of light. The predetermined requirements include that the light is within a predetermined intensity range. For example, if the light is very dim (e.g., lower than a predetermined intensity threshold), device 10 will switch to voice mode 612 automatically.

In another exemplary embodiment, the predetermined requirements include that the presence of certain accessories are detected by device 10. For example, when an accessory microphone is plugged in device 10, device 10 may automatically switch to voice mode 612.

In various embodiments, a user may have choices whether and how to enable a predetermined requirement. The user may change settings from time to time based on his/her preference, which setting may be stored in a table in memory accessible by the processing circuit to determine in which of traditional mode 611, voice mode 612, or another mode to operate.

Referring to FIGS. 9.1 and 9.2, two systems for converting or translating voice into texts are illustrated, though other systems are contemplated. Referring to FIG. 9.1, voice-to-text module 641 may convert the voice into text within the processing circuit. After receiving the voice signal from the microphone (step 910), the voice to text module may recognize and convert the voice signal into a text signal (step 911). Voice-to-text module 641 may employ readily available speech recognition technologies. Referring to FIG. 9.2, after receiving the voice signal (step 921), voice-to-text module 641 may send the voice signal through antenna system 122 to another computer, computer 132 (step 922). In one embodiment, computer 132 is a server maintained by a service provider remote from device 10. The server provides voice-to-text service to device 10, receiving voice signals from device 10 and sending text signals to device 10 (step 923). In one exemplary embodiment, the voice-to-text module may be an independent software program. In another exemplary embodiment, the voice-to-text module may be embedded within operating system 601. In yet another exemplary embodiment, the voice-to-text module may have a dedicated processing circuit (e.g., comprising a processor).

Figure 10:
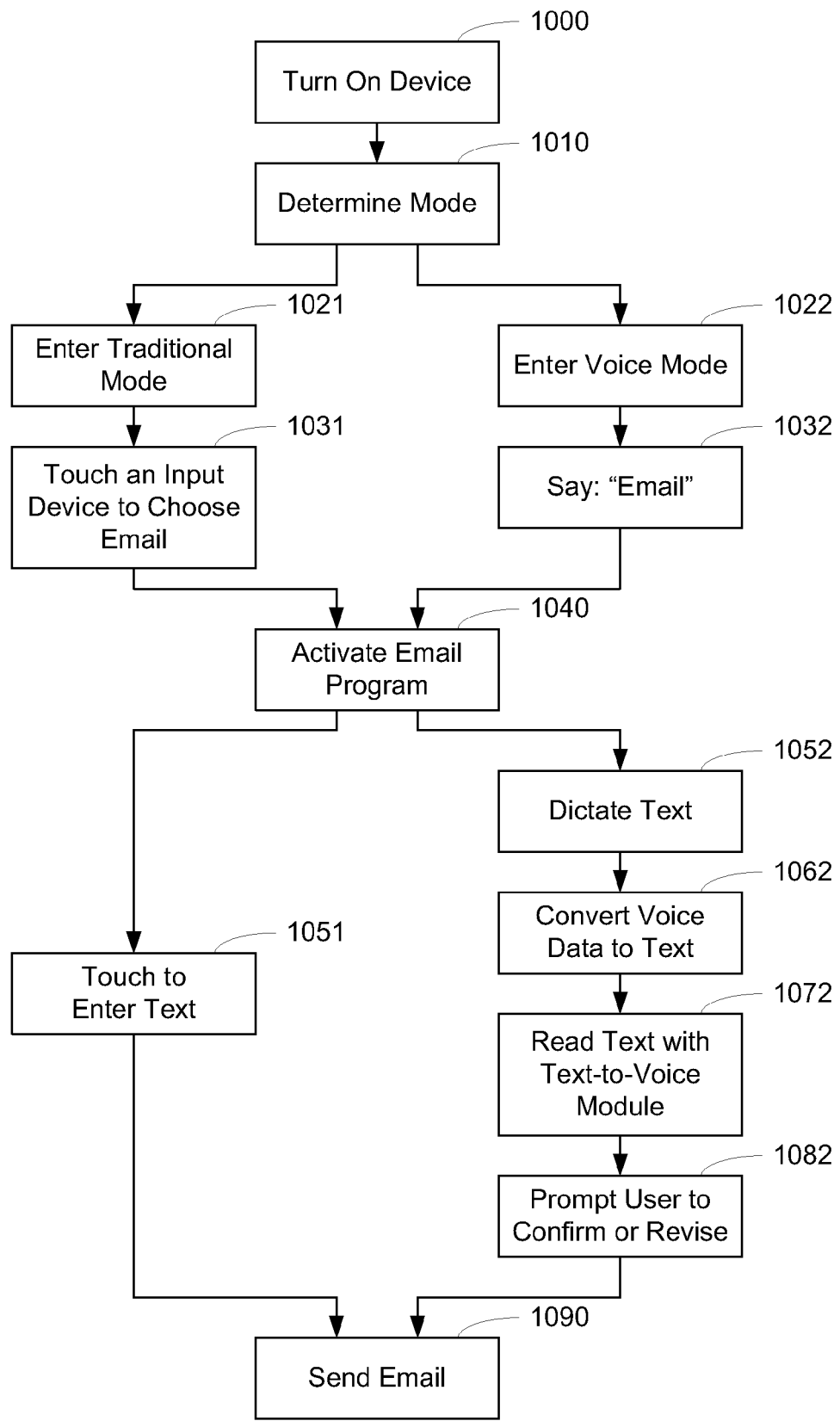
FIG. 10 is a flowchart of processes of a user sending an email under both modes of the mobile device according to an exemplary embodiment.

Referring to FIG. 10, one exemplary embodiment of the processes of sending an email in both traditional mode 611 and voice mode 612 is shown. At step 1000, device 10 is turned on or otherwise enabled. At step 1010, the mode is determined, for example using one of the methods described hereinabove. After device 10 enters traditional mode 611 (step 1021), the user can open or operate an email service, function, or program by using user input device 621 (step 1031). After device 10 enters voice mode 612 (step 1022), the email service, function, or program is opened or operated once the processing circuit detects that the user says: "Email" (step 1032). Once the email is opened or activated (step 1040), in traditional mode 611, device 10 is configured to receive text from a user input device 621, e.g., a keypad (step 1051). In voice mode 612, the steps of composing an email include receiving a dictation of the text from the user (step 1052), voice-to-text module converting the voice into text (step 1062), the text-to-voice module 642 reading the converted text to the user (step 1072) and the user revising or confirming the text (step 1082). The user may indicate confirmation by saying "confirmed" or "send" or other response, which is received by device 10. The user may indicate that the text need further revision by saying "revise." Device 10 may be configured to send the email when the user eventually confirms the text of the email in either operating mode (step 1090). Other instructions regarding emails may be provided by voice. For example, a user may say the name or email address of the recipient, the title of the email, and the email may be marked as highly important, etc. When the user wants to compose the text of the email body, the user may say "email body." If the user does not want to send immediately, the user may say "store as draft." Further, in voice mode 612, when an email is received, operating system 601 may waken device 10 from a sleep state (e.g. a low-power state) and provide voice to the user, e.g., "an email is received." The user can then provide a series of instructions regarding the new email, e.g., "read it," "reply," "forward," "reply to all," "next email." According to this embodiment, device 10 is configured to receive requests from the user via voice, process the requests, provide one or more responses via audio output, and receive additional requests from the user via voice (or input keys) to further process a related task (such as an e-mail, calendar appointment, web browsing, etc.) in the same application.

Figure 11:
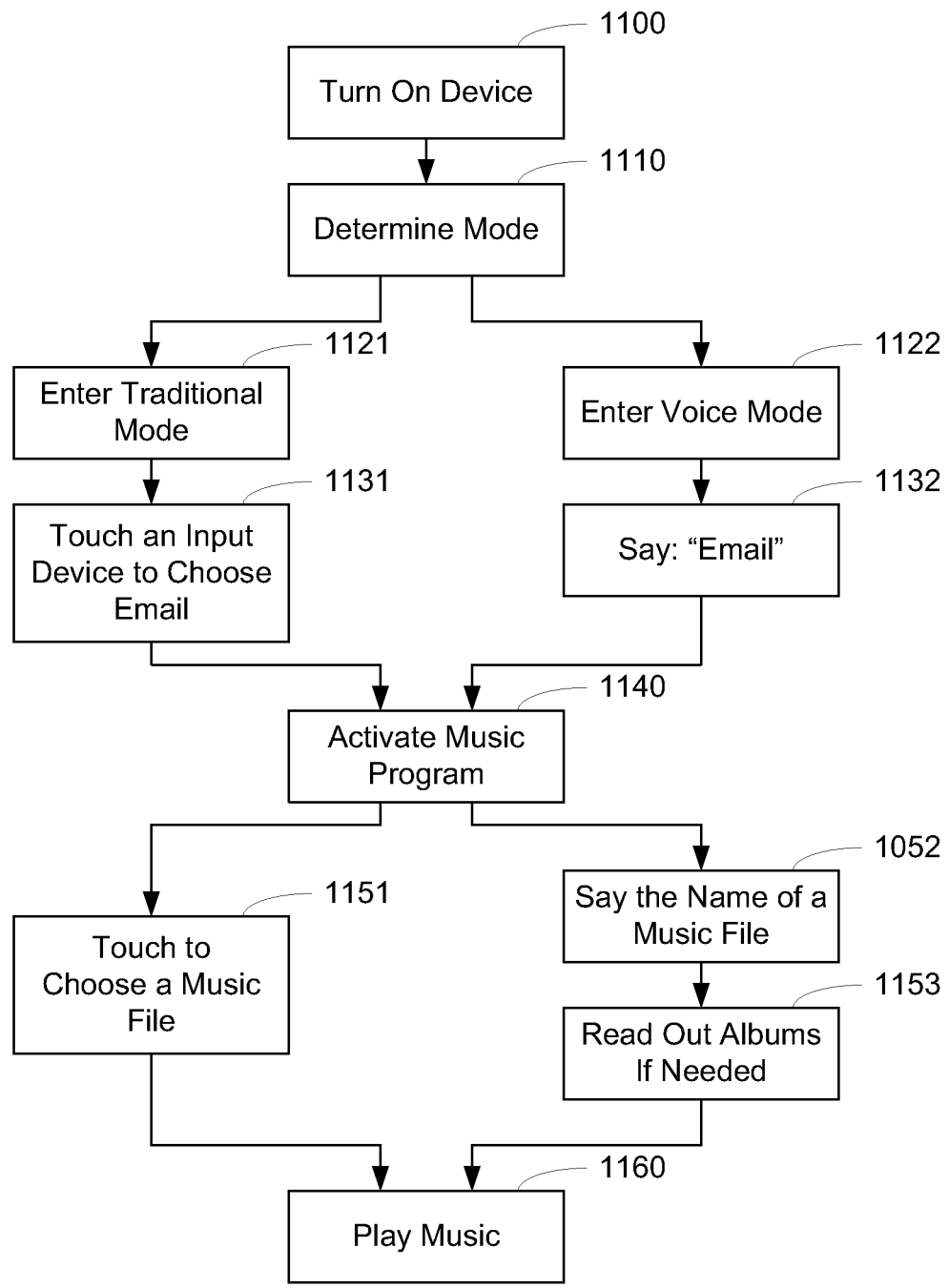
FIG. 11 is a flowchart of processes of a user playing music under both modes of the mobile device according to an exemplary embodiment.

Referring to FIG. 11, an exemplary embodiment of a process of playing a music file is illustrated. When device 10 is turned on (step 1100), the operating mode is determined by either user input or the circumstance/internal state of device 10 (step 1110). If device 10 enters a traditional mode 611 (step 1121), device 10 is configured to receive instructions from a user input device 621, e.g., a keypad (step 1131). Alternatively, if device 10 enters a voice mode 612 (step 1122), device 10 is configured to receive instructions from a microphone 622, e.g. a user saying "music" (step 1132). When the music program is activated or a music player is opened (step 1140), in traditional mode 611, device 10 is configured to receive the user's selection of the music file from a user input device 621 (step 1151). In voice mode 612, device 10 is configured to receive the user's selection of the music file from a microphone 622 (step 1152). Device 10 may then play or read out one or more albums corresponding to the selected music file, if needed (step 1153). The device 10 will then play the selected music file received under either operating mode (step 1160). A user can also provide other instructions by voice, such as "stop," "forward to next song," "volume up," "volume down."

In one exemplary embodiment, a user can open a web browser under voice mode 612. When the device is in voice mode 612, a user can say "Internet Browsing." Operating system 601 is configured to detect through a voice sensor, e.g., a microphone, a voice "Internet Browsing." System 10 then opens a web browser. Operating system 601 is configured to detect an Internet address that the user wants to browse. In one exemplary embodiment, that internet address is directed to a website that ideally has a specifically designated purpose or only a few choices so that device 10 can read the content of the web site through a speaker. In another exemplary embodiment, a web site is specifically created for users that cannot see, watch or read while visiting its Internet address and information and choices are given by voice already.

In one exemplary embodiment, a user may make phone calls under voice mode 612. Operating system 601 is configured to detect the user saying "phone" and to activate a phone call program. Operating system 601 is then configured to detect the user saying the name of the person the user wants to call or the number the user wants to dial. After confirmation, device 10 automatically (e.g., without requiring manual or physical user input) makes the phone call to the instructed person or number. The phone call program can also be activated when there is an incoming call. A user may say instructions regarding this incoming phone call, e.g., "pick up," "reject," or "direct to voicemail." When a user tries to make or answer a phone call, and the headset or earphone is not connected, operating system 601 may instruct device 10 to enter speaker mode and provide voice through speaker 26.

In one exemplary embodiment, a user may send text messages under voice mode 612. Operating system 601 is configured to detect the user saying "message" and to start the message program. Operating system 601 is configured to receive the user dictating the content of the message. Device 10 may read the text of the message to him through text-to-speech module 601 and a speaker. After confirmation that the text is correct, the user then may say the person's name or number that he/she wants the message to be sent to.

In one exemplary embodiment, a user may search the Internet under voice mode 612. The user may say "internet searching" in order to open an "Internet Searching" service/function/program. The user may then say the search term and device 10 will automatically search for the said search term. In one embodiment, device 10 will read the search result by text-to-speech module 642.

It is noted that, in one exemplary embodiment, all or most of applications and programs that can be opened in voice mode 612 can be opened in traditional mode 611 and vice versa. In one exemplary embodiment, operating system 601 has two user interfaces, the traditional interface and the voice interface. In the voice interface, the user may give every instruction by speaking to device 10 and receive response from device 10 from a speaker. All interactions between the user and device 10 may be conducted through voice. The user does not need to touch anything to give instructions or watch display 18 to get feedback or information.

Figure 12:
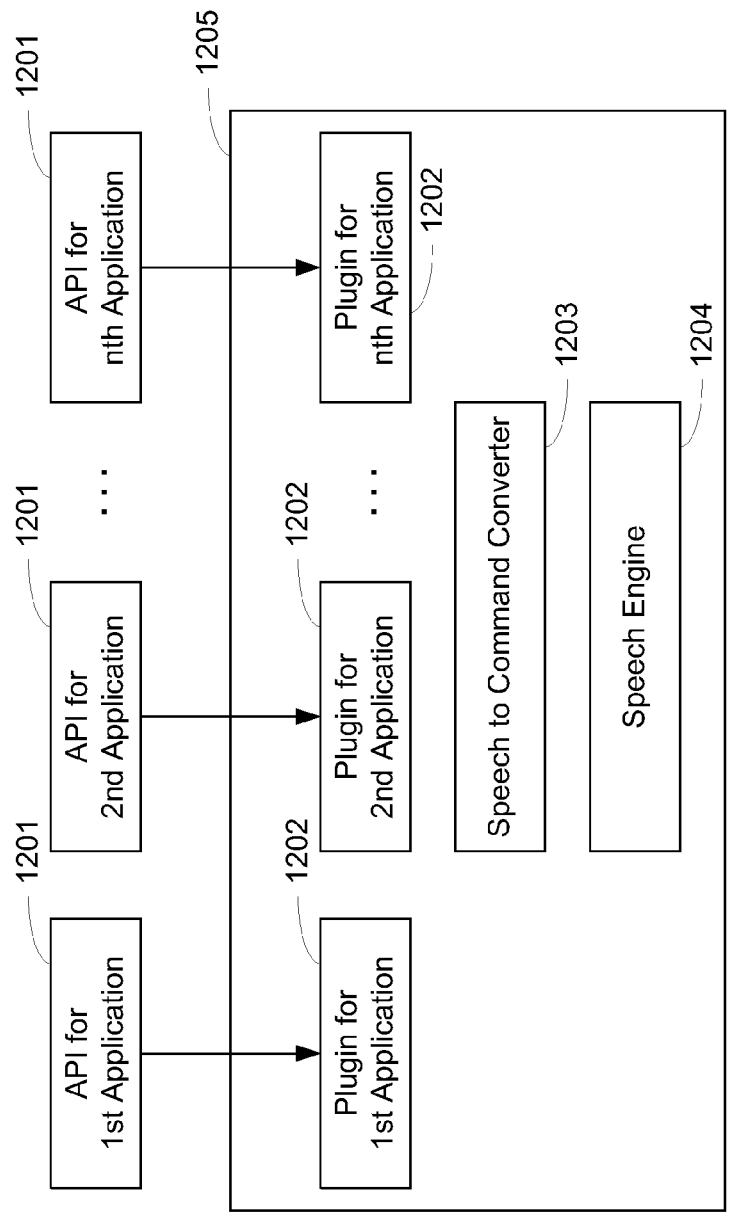
FIG. 12 is a block diagram of an interface to applications, according to an exemplary embodiment.

Regarding FIG. 12, an exemplary embodiment of an interface to applications is illustrated. In one exemplary embodiment, conversation with the device can be started by two triggers. One trigger is Device to User (Device driven trigger DDT), e.g., when the user receives a phone call or when the user receives an SMS, email or any notification. Another trigger is User to Device (User driven trigger UDT), e.g., when the user sends new email/SMS, browses the web, retrieves navigation information. In another exemplary embodiment, for each conversation, there will be a context. For example, for DDT, the trigger will be a phone call, SMS or any notification and the context will be a phone application, SMS application and an identified application related to the notification. Thus, the context will be an application that is related to the trigger. For UDT, the trigger will be the user sending an email/SMS, browsing web, getting navigation, etc. and context will be identified as an application, e.g. email/SMS, web browser, navigation tool, etc. In this manner Speech/Application Interface Manager ("SAIM") 1205 is configured to identify the application to interact with and monitor the state of the context. Once context is selected, SAIM 1205 is configured to identify actions. In one exemplary embodiment, SAIM 1205 will identify the action using dynamic grammar. For example, if a voice is received by the processing circuit, SAIM 1205 is configured to identify the function needs to call for the context application. SAIM 1205 is also configured to recognize that dictation is needed and to enter the free text mode in which the voice can be converted into text. After SAIM 1205 identifies context, action and free text, it will map the context and action to the right Application plugin 1202 and Application Programming Interface 1201 ("API"). Using API 1201 exposed by the application, application plugin 1202 will interface with the application. With API 1201, the application will be totally unaware of voice mode/profile and speech interface. A person with ordinary skill in the art would recognize that there are at least three types of grammar in speech recognition. There is static grammar, where the grammar is pre-fed to the speech engine. For example, numbers and names of cities or countries are pre-fed to the speech engine. There is dynamic grammar, which is fed at run time to speech engine based on context. For example, under a dynamic grammar, all names in an address book are fed to a speech engine at run time and the user is asked to "say a name" and the processing circuit would search the contact from the names fed. In another example of a dynamic grammar, the processing circuit is configured to feed a few options, e.g., read, reply, forward, compose, to speech engine and to ask user to say one of these and to match user utterances to one of these four. In yet another example, the processing circuit is configured to feed names of movies playing at nearest AMC and to ask the user to "say a name". There is free speech grammar, e.g., the processing circuit taking dictation or notes. A person with ordinary skill in the art would recognize that the speech to text engine/module 641 can use any one or combination of these grammars and any other applicable grammars. In one exemplary embodiment, SAIM 1205 is integrated within Operating System 601. In another exemplary embodiment, SAIM 1205 is an additional software that is installed on Operating System 601.

Various embodiments disclosed herein may include or be implemented in connection with computer-readable media configured to store machine-executable instructions therein, and/or one or more modules, circuits, units, or other elements that may comprise analog and/or digital circuit components (e.g. a processor or other processing circuit) configured or arranged to perform one or more of the steps recited herein. By way of example, computer-readable media may include RAM, ROM, CD-ROM, or other optical disk storage, magnetic disk storage, flash memory, or any other medium capable of storing and providing access to desired machine-executable instructions. The use of circuit or module herein is meant to broadly encompass any one or more of discrete circuit components, analog and/or digital circuit components, integrated circuits, solid state devices and/or programmed portions of any of the foregoing, including microprocessors, microcontrollers, ASICs, programmable logic, or other electronic devices.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A mobile computing device, comprising:
   a housing;
   a user input device to detect a user touching the mobile device or an accessory of the device and to covert the touches into first digital instructions;
   a voice sensor to detect sound;
   a speech conversion module to convert the sound into second digital instructions; and
   a processing module to:
      provide the first digital instructions to any of a plurality of different programs or applications when in a first mode,
      provide the second digital instructions to any of the plurality of different programs or applications when in a second mode,
      provide a common instruction to at least one of the plurality of different programs or applications when a same user instruction is provided via the user input device or voice sensor, the common instruction provided to at least one of the plurality of different programs or applications in a same data format regardless of whether the same user instruction is provided via user input device or voice sensor; and
      switch modes of operation without receiving specific instructions from the user to switch the mode at a time of switching when at least one predetermined requirement is met, wherein at least one predetermined requirement comprises user defined calendar event set and activated on the mobile computing device.

2. The mobile device of claim 1, wherein for a same user instruction provided via the user input device or voice sensor, the first and second digital instructions are received by any of the plurality of different programs or applications in the same manner.

3. The mobile device of claim 1, the digital instruction received by any of the plurality of different programs or applications comprising playing a sound file stored in the device.

4. The mobile device of claim 1, the digital instruction received by any of the plurality of different programs or applications comprising manipulating a file or a document.

* * * * *